C. SEALY.
AUTOMOBILE PILOT SIGNAL.
APPLICATION FILED MAY 8, 1920.
1,353,790.
Patented Sept. 21, 1920.
2 SHEETS—SHEET 1.
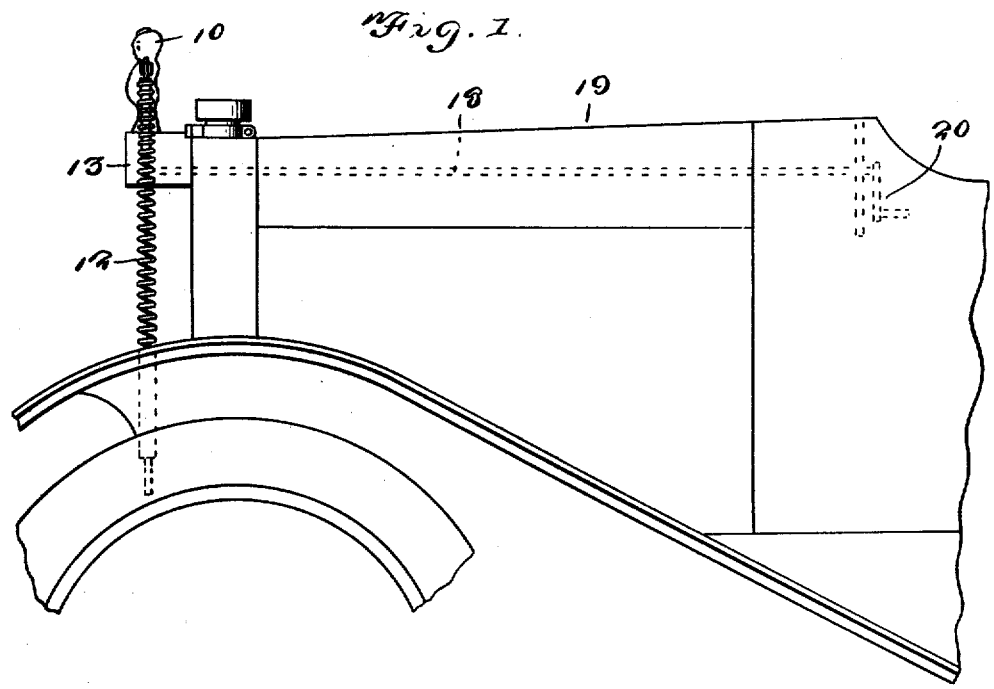
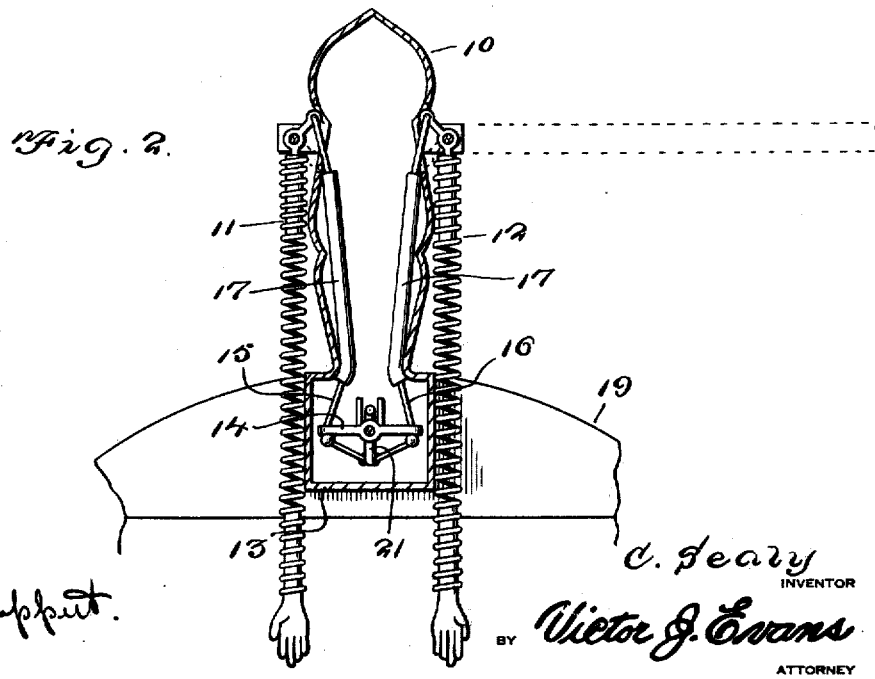

C. SEALY.
AUTOMOBILE PILOT SIGNAL.
APPLICATION FILED MAY 8, 1920.
1,353,790.
Patented Sept. 21, 1920.
2 SHEETS—SHEET 2.
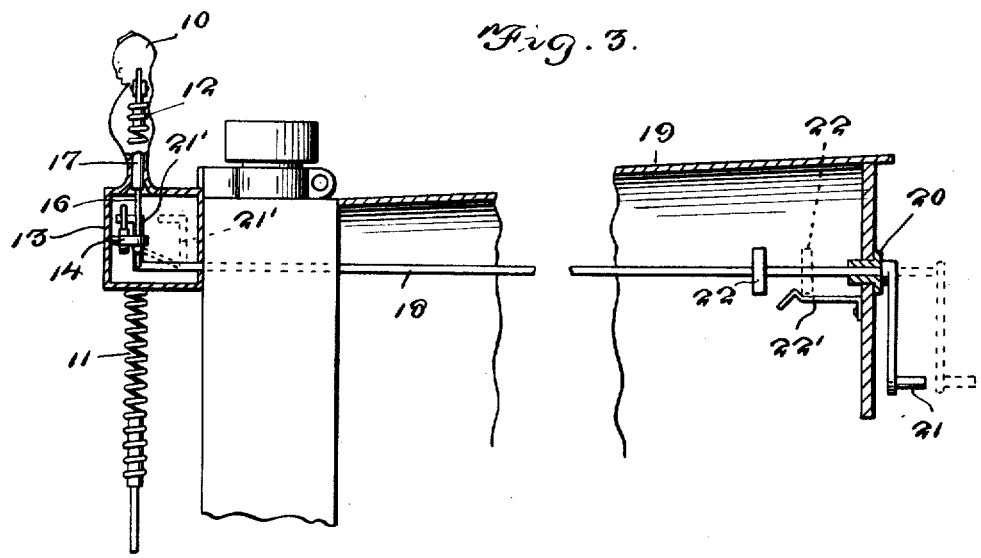
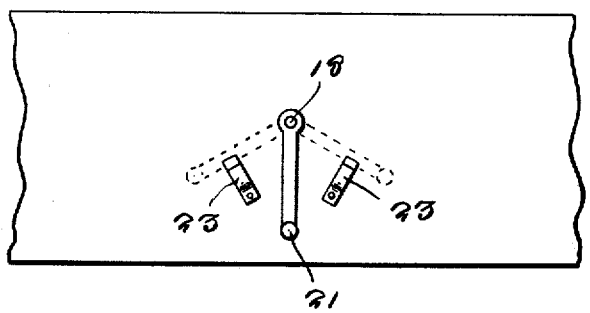

UNITED STATES PATENT OFFICE.

CHRISTOPHER SEALY, OF BROOKLYN, NEW YORK.

AUTOMOBILE PILOT-SIGNAL.

1,353,790.   Specification of Letters Patent.   Patented Sept. 21, 1920.

Application filed May 8, 1920. Serial No. 379,910.

*To all whom it may concern:*

Be it known that I, CHRISTOPHER SEALY, a citizen of the United States, residing at Brooklyn, in the county of Kings and State of New York, have invented new and useful Improvements in Automobile Pilot-Signals, of which the following is a specification.

The object of the invention is to provide a simple inexpensive and efficient signaling device for use in connection with automobiles and similar vehicles, adapted to be readily applied and to serve as a means of indicating to pedestrians, approaching vehicles and drivers of following vehicles the intention of the driver of the machine which is equipped with the device, as to checking the speed of his machine, or the turning to the right or to the left, with the general purpose as with other devices of this type of avoiding accident in the way of collision and the like.

To this end the invention consists in a construction, combination and relation of parts of which a preferred embodiment is shown in the accompanying drawing, it being understood that changes in form and proportion may be resorted to, within the scope of the claims, without departing from the principles involved.

In the drawing:

Figure 1 is a side view of the apparatus applied in the operative position to an automobile.

Fig. 2 is a front view of the same.

Fig. 3 is a longitudinal sectional view to show particularly the means by which motion is communicated to the arms of the signaling figure from the seat of the driver in the car.

Fig. 4 is a detailed view showing the crank handle of the operating rod and the means for holding the crank handle in adjusted position.

Essentially the apparatus consists of a figure 10 preferably representing a man or a kewpie having the pivotally mounted right and left arms 11 and 12 adapted for extension into horizontal or other signaling positions and adapted when released to fold or drop to a pendent position at the sides of the body of the figure, said figure being mounted upon a suitable base 13 which may as illustrated be hollow and contain an arm 14 movable to the right or to the left as may be required and having connected therewith cords, chains or other flexible connections 15 and 16 which extend upward through guides 17 in the legs of the figure and the body thereof to the inner ends of said arms respectively, to the end that by the movement of the arm located within the box, the arms of the figure may be extended either to the right or to the left or both arms may be extended simultaneously to indicate the stopping or checking of the forward movement of the machine with which the apparatus is equipped.

The means for operating the arms of the figure may be variously modified in construction, but as shown in the drawing a shaft 18 is mounted longitudinally of the hood 19 of the vehicle and extends through a suitable bearing 20 in the dash board thereof where it is fitted with a grip 21 within easy reach of the driver of the machine while sitting at the steering wheel, and said shaft is provided adjacent to its forward end and the base upon which the figure is supported by a crank arm 21' connected with the arm 14, said shaft being adapted either for rocking movement to strain one or the other of the flexible connections, to thereby raise one or the other of the arms of the figure or the signaling arms as they may properly be termed, or of longitudinal or axial movement as indicated by the dotted lines in Fig. 3, so as to strain both connections and thus raise both of the signaling arms to indicate that it is the intention of the driver to check or stop his machine. The flexible elements 15 and 16 respectively and their corresponding extremities are secured to the operating rod 18, so that when the rod is moved longitudinally both of the flexible elements are pulled upon to operate both of the arms simultaneously, the flexible elements being indicated by dotted lines in Fig. 3 showing the position which they occupy when the operating rod is moved longitudinally of the hood for the purpose mentioned. A nut 22 on the rock shaft or operating rod may serve as a suitable means for holding the same in its adjusted position with both signaling arms extended by engagement with a dog or lip 22' suitably located in or supported by the dash board of the machine, while detents 23 on either side of the vertical plane of said rock shaft or operating rod may serve as shown in the drawing, as means for holding the rock shaft in position to maintain either of the signaling arms extended by engagement with the crank arm 21 to which the said grip is attached, it being obvious that after the parts have been held in the adjusted position for the required length of time, it is simply necessary to disengage the arm from the detent in order to permit the parts to assume their normal positions due to the weight of the signaling arm which has been extended or displaced.

It is obvious that the apparatus described can be applied to any of the ordinary types of automobiles without material modification in the construction of the latter inasmuch as it is simply necessary to provide an opening in the dash board through which the operating shaft or rod may be extended so as to arrange the grip at the rear end thereof within easy reach of the hand of the operator, to the end that the shaft may be adjusted to extend either or both of the arms of the figure at a moment's notice and with a minimum of movement or effort upon his part.

What is claimed is:—

1. A pilot signal for automobiles having a figure provided with right and left pivotal arms, and means for mounting the same upon the hood of a car, a shaft or operating rod mounted in longitudinal relation with the vehicle and having a crank arm flexibly connected to said arms, and means whereby rocking or longitudinal movement may be imparted to said operating rod for actuating either or both of said signaling arms.

2. An automobile pilot signal having a figure provided with right and left pivotal signaling arms, a hollow base for said figure adapted for attachment to an automobile hood, a rock shaft or operating rod arranged longitudinally with reference to the automobile hood and having at its forward end a crank arm, flexible connections extending from said crank arm respectively to the inner ends of the signaling arms and located in guides formed in said figure, the rock shaft or operating rod being capable of rocking and longitudinal movement, and means for locking said rock shaft or operating rod in its adjusted position.

3. An automobile pilot signal having a figure provided with right and left pivotal signaling arms, a hollow base for said figure adapted for attachment to an automobile hood, a rock shaft or operating rod arranged longitudinally with reference to the automobile hood and having at its forward end a crank arm, flexible connections extending from said crank arm respectively to the inner ends of the signaling arms and located in guides formed in said figure, the rock shaft or operating rod being capable of rocking and longitudinal movement, and means for locking said rock shaft or operating rod in its adjusted position, and consisting of a crank arm on the rear end of said rock shaft or operating rod, right and left detents for engagement with said arm in its right and left adjusted positions, and a notch in the rod for engagement with a lip or detent when the rod has been moved longitudinally to extend both of the signaling arms.

In testimony whereof I affix my signature.

CHRISTOPHER SEALY.